J. P. FISHER.
MULTIPLE ORIFICE METER.
APPLICATION FILED MAR. 16, 1917.

1,273,597.

Patented July 23, 1918.
2 SHEETS—SHEET 1.

Witness
H. H. Lybrand

Inventor
James P. Fisher
By S. Jay Teller
Attorney

J. P. FISHER.
MULTIPLE ORIFICE METER.
APPLICATION FILED MAR. 16, 1917.

1,273,597.

Patented July 23, 1918.
2 SHEETS—SHEET 2.

Witness
H. H. Lybrand

Inventor
James P. Fisher
By S. Jay Teller
Attorney

UNITED STATES PATENT OFFICE.

JAMES P. FISHER, OF BARTLESVILLE, OKLAHOMA.

MULTIPLE ORIFICE-METER.

1,273,597.  Specification of Letters Patent.  Patented July 23, 1918.

Application filed March 16, 1917. Serial No. 155,145.

*To all whom it may concern:*

Be it known that I, JAMES P. FISHER, a citizen of the United States, residing at Bartlesville, in the county of Washington and State of Oklahoma, have invented certain new and useful Improvements in Multiple Orifice-Meters, of which the following is a specification, reference being had therein to the accompanying drawings.

The invention relates particularly to the disk holding device or housing of orifice meters and one object of the invention is to provide improved means adapted to securely hold an orifice disk and at the same time adapt it to permit the disk to be easily moved to allow substitution or adjustment. Another object of the invention is to provide a disk holding means which is so formed as to leave substantially the entire periphery of the disk open to inspection. Still another object of the invention is to provide a housing which is adapted to hold either a disk having one aperture therein or a rectangular plate having a plurality of apertures therein. Other objects of the invention will be apparent from the following specification and claims.

In the accompanying drawings I have shown one embodiment of the invention which I now prefer, but it will be understood that the drawings are intended merely to be illustrative and are not intended to define or limit the scope of the invention, the accompanying claims being relied upon for that purpose.

Of the drawings, Figure 1 is a side view of a section of pipe line having applied thereto an orifice meter embodying the invention.

Fig. 4 is a detailed view of one of the disks.

Fig. 5 is an edge view of the disk shown in Fig. 4.

Fig. 6 is a detailed view showing a plate having a plurality of different sized orifices therein which when desired may be used in lieu of the disk shown in Fig. 4.

Figure 1:
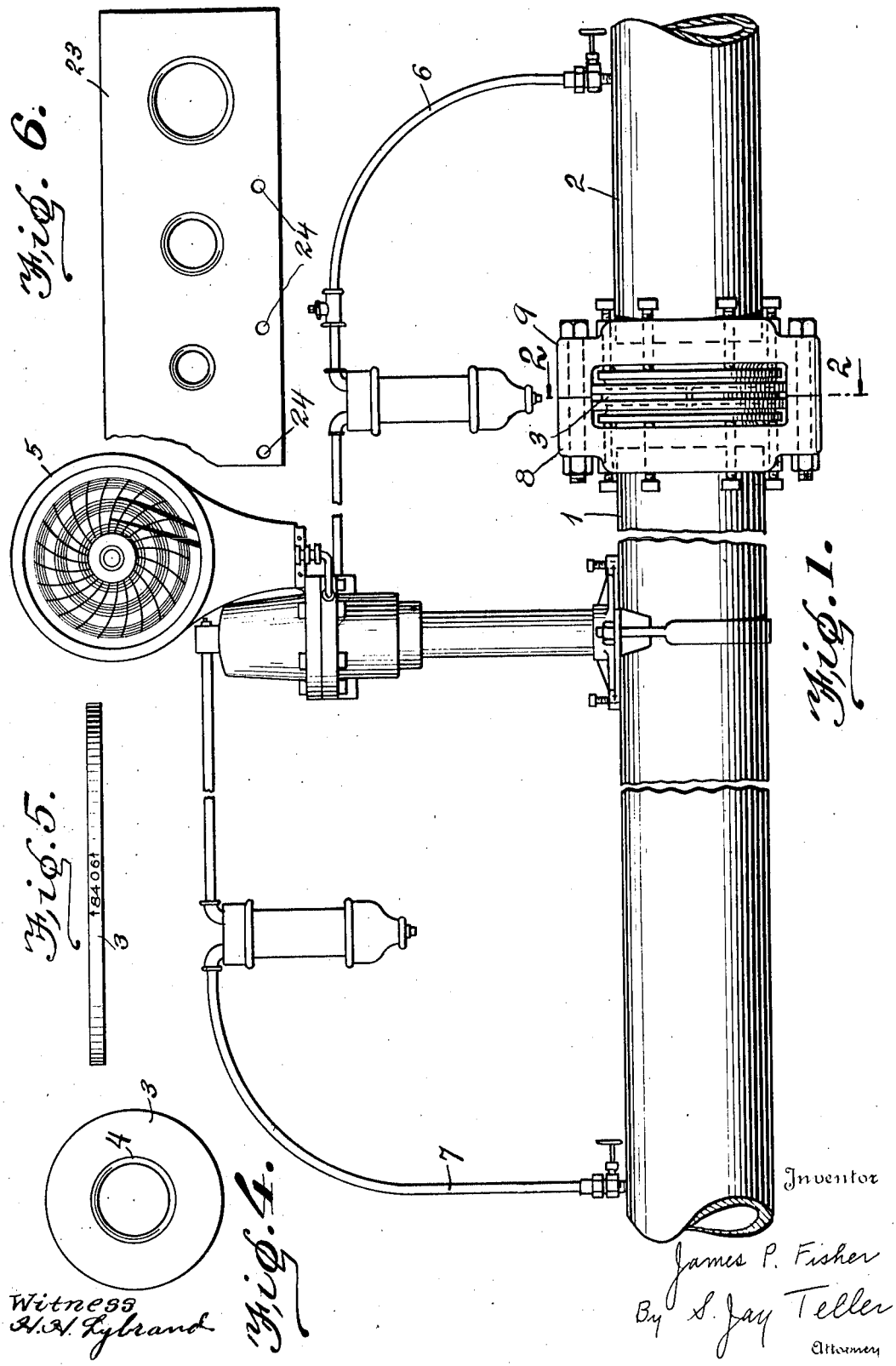

Referring to the drawings, 1 and 2 represent two adjacent sections of a pipe line adapted for conducting gas from one point to another. Suitably held in position between the two sections 1 and 2 is a disk 3 having an orifice 4 therein. The means for securing the disk will be described in detail hereinafter.

For recording differences in pressure in the pipe line at opposite sides of the disk 3 there is provided a combination recording gage 5 having two pens, one of which records the static pressure in the line and the other of which records a drop in pressure through the orifice. This gage 5 is connected with one side of the line by means of a pipe 6 and with the other side of the line by means of a pipe 7. As the gage and its connections of themselves constitute no part of my present invention, further description of them is omitted.

Secured respectively to the two pipe sections 1 and 2 are similar flanges 8 and 9, these flanges coöperating to form a housing. Preferably these flanges are threaded onto the pipes, the inner bore of the flanges being of the same diameter as the interior of the pipes. The two flanges are connected together by means of bolts 10—10, four such bolts being preferably provided as shown. Preferably in addition to the bolts 10—10 supplemental smaller bolts 11—11 are also provided for connecting the flanges. By means of the flanges 8 and 9 and the bolts 10—10 and 11—11, the two pipes 1 and 2 are rigidly connected together and the connection is not broken during the operation or adjustment of the meter.

Figure 2:
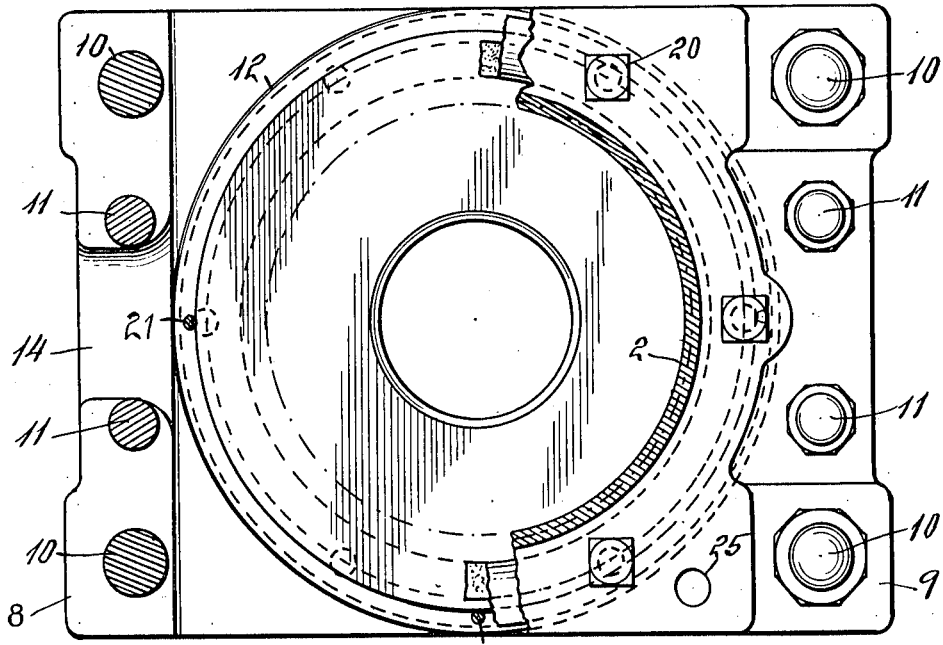
Fig. 2 is a transverse view showing the device for holding the orifice disk, this device being shown partly in elevation and partly in section along the line 2—2 of Fig. 1.

Between the inner cylindrical portions 12 and 13 of the flanges is positioned the aforesaid orifice disk 3. The inner cylindrical portions 12 and 13 are separated from each other so that the disk 3 can be inserted or removed freely with a clearance on both sides. As is clearly shown in Fig. 2, the body parts of the flanges are open on each side so that a disk such as 3, can be freely inserted or removed. Preferably in addition the body part of each flange at each side thereof is provided with an opening 14 and adjacent openings of the two flanges come together to form a rectangular aperture as indicated by dotted lines in Fig. 3.

For securing the disk 3 in place and for making tight joints between it and the cylindrical portions 12 and 13 of the flanges, a suitable mechanism is provided which in general character is similar to a stuffing box.

Figure 3:
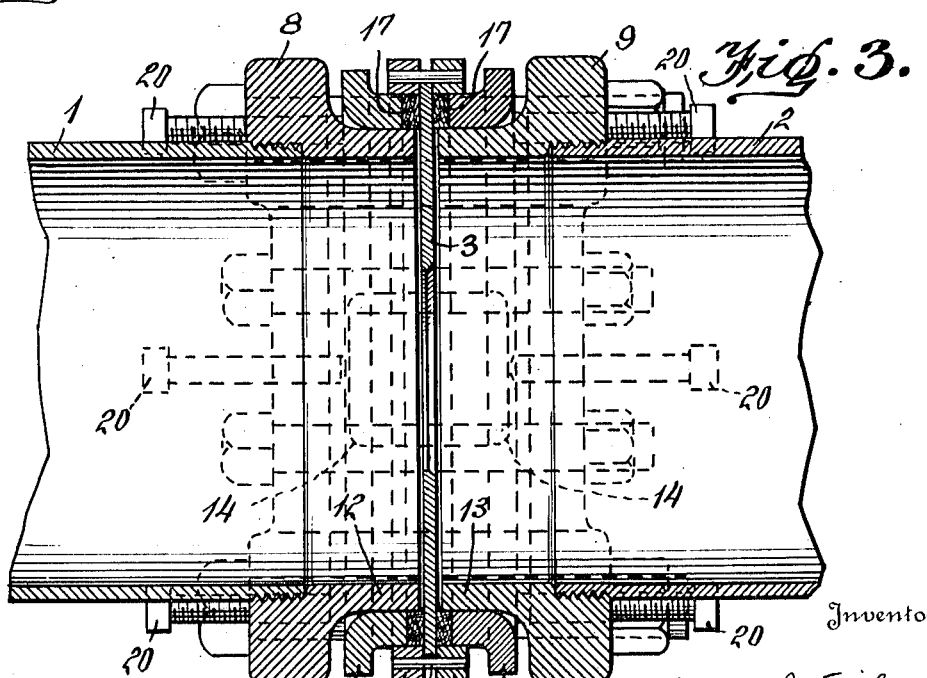
Fig. 3 is a longitudinal sectional view of the parts shown in Fig. 2.

As illustrated particularly in Fig. 3, two flanged rings 15 and 16 are provided surrounding respectively the cylindrical flange portions 12 and 13. These rings are oppositely positioned and between each ring and the disk there is provided a ring 17 of suitable packing material. In order to support the packing material and prevent its being squeezed outward, two restraining rings 18 and 19 are provided respectively surrounding the inner parts of the rings 15 and 16 and the respective packing rings 17.

For pressing the rings 15 and 16 toward each other to compress the packing, I provide a series of set screws 20—20 extending through the body part of each flange. As is shown, six equally spaced set screws are provided on each side. It will be seen that by turning these set screws, the rings 15 and 16 can be forced toward each other and toward the disk 3, thus compressing the packing 17 and forming a tight joint between the disk and the cylindrical parts 12 and 13.

Preferably in order to accurately position the disk 3 with the aperture thereof in the center of the pipe line, I provide pins 21—21 which extend through the rings 18 and 19 at suitable points.

When it is desired for any reason to remove a disk and to replace it by another one having an aperture of a different size, it is only necessary for the attendant after removing the pressure from the line, to loosen the set screws 20—20 and then remove the disk. A substitute disk having an aperture of the required size is then slipped in place and the set screws 20—20 are again tightened. It will be observed in making such a change the main connections between the two pipe sections are in no way disturbed. In accordance with earlier practice, it has been necessary to disconnect or at least loosen the main flanges to remove or insert a disk and frequently because of springing of the pipes or warping of the flanges it has been very difficult to again tighten the flanges in such a way as to bring them into proper relative positions and to secure tight joints with the disk.

As clearly indicated in Fig. 5, each disk may have, and in fact preferably does have, suitable markings on its periphery to indicate the size and character of the orifice and also the direction of flow. As will be clearly seen from an inspection of Fig. 2, the flanges 8 and 9 are so constructed that substantially the entire periphery of the disk is exposed for observation. By providing markings at a plurality of points around the periphery it is possible for the attendant to easily observe the character of the disk which is being used.

It will be observed that a device embodying my invention is adapted for the use of a rectangular orifice plate as well as for the use of an orifice disk. In Fig. 6 I have shown a plate 23 which can be used, this plate having three orifices of different sizes. It will be obvious from an inspection of Fig. 2 that by simply removing the lower pin 21, the plate 23 can be put in place and adjusted to bring one or another of the orifices thereof into position at the center of the pipe line. Preferably, in order that the orifices may be easily and accurately positioned, I provide a plate with small holes 24 near one side thereof, these holes being adapted to receive a dowel pin extending through a hole 25 in the main housing. By withdrawing or partly withdrawing the dowel pin and by loosening the set screws 20—20 as described, it is possible to move the plate 23 from one position to another. When the desired position is reached the dowel pin is inserted in the proper hole 24 and the set screws 20—20 are again tightened.

What I claim is:

1. In a device of the character described, the combination of a housing adapted to be positioned between and connected with two adjacent pipe sections and having a transverse opening permitting the insertion or removal of an orifice plate between the pipe sections without disturbing the relationship of any of the housing parts, and means for forming fluid tight joints between the plate and the housing.

2. In a device of the character described, the combination of two flanges adapted to be connected respectively with two adjacent pipe sections, and means for fixedly connecting the flanges together to form a housing, the said housing having a transverse opening permitting the insertion or removal of an orifice plate between the pipe sections without disturbing the connection between the flanges.

3. In a device of the character described, a housing adapted to be positioned between and connected with two adjacent pipe sections and having a transverse opening from one side to the other thereof permitting the insertion or removal of an orifice plate between the pipe sections without disturbing the relationship of any of the housing parts.

4. In a device of the character described, a housing adapted to be positioned between and connected with two adjacent pipe sections and having a plurality of transverse openings which permit the insertion or removal of an orifice plate between the pipe sections without disturbing the relationship of any of the housing parts and which permit the inspection of substantially the entire periphery of the plate.

5. In a device of the character described, a housing adapted to be positioned between and connected with two adjacent pipe sections, the said housing having a transverse opening from one side to the other thereof permitting the insertion or removal of an orifice plate between the pipe sections without disturbing the relationship of any of the housing parts and also having supplemental openings permitting the inspection of the periphery of the plate.

6. The combination of a disk having a central orifice therein and markings on its periphery indicating the character of the orifice, and a housing adapted to be positioned between and connected with two adjacent pipe sections and having a plurality of openings which permit the insertion or removal of the disk between the pipe sections without disturbing the relationship of any of the housing parts and which permit the inspection of substantially the entire periphery of the disk when in place.

7. The combination of a housing adapted to be positioned between and connected with two adjacent pipe sections and having a transverse opening permitting the insertion or removal of an orifice plate between the pipe sections without disturbing the relationship of any of the housing parts, and a double stuffing box for forming tight joints between the plate and the parts of the housing at opposite sides of the plate.

8. The combination of a housing adapted to be positioned between and connected with two adjacent pipe sections and having a transverse opening permitting the insertion or removal of an orifice plate between the pipe sections without disturbing the relationship of any of the housing parts, two pressure rings surrounding parts of the housing at opposite sides of the plate, two packing rings between the plate and the respective pressure rings, two retaining rings respectively surrounding the pressure rings and the packing rings on the two sides of the plate, and means connected with the housing for forcing the two pressure rings together.

9. The combination of a housing adapted to be positioned between and connected with two adjacent pipe sections and having a transverse opening permitting the insertion or removal of an orifice disk between the pipe sections without disturbing the relationship of any of the housing parts, a double stuffing box for forming tight joints between the disk and the parts of the housing at opposite sides of the disk, and means carried by the stuffing box to engage the disk and hold it in central position.

10. In a device of the character described, a housing adapted to be positioned between and connected with two adjacent pipe sections and having a transverse opening adapted to receive either a disk having a single central orifice or a rectangular plate having a plurality of spaced orifices, the said opening being positioned to permit the insertion or removal of the disk or rectangular plate between the pipe sections without disturbing the relationship of any of the housing parts.

11. In a device of the character described, the combination of a housing adapted to be positioned between and connected with two adjacent pipe sections and having a transverse opening permitting a rectangular plate having a plurality of orifices therein to be inserted or removed between the pipe sections without disturbing the relationship of any of the housing parts, and a dowel pin for holding the plate with any of its orifices at the center of the pipe sections.

12. The combination of two adjacent pipe sections, an orifice plate, and a housing positioned between and connected with the pipe sections and having a transverse opening permitting the insertion or removal of the orifice plate between the pipe sections without disturbing the relationship of any of the housing parts.

13. The combination of two adjacent pipe sections, an orifice plate, a housing positioned between and connected with the pipe sections and having a transverse opening permitting the insertion or removal of the orifice plate between the pipe sections without disturbing the relationship of any of the housing parts, a recording gage, and pipe connections between the gage and each of the said pipe sections on opposite sides of the orifice plate.

In testimony whereof, I affix my signature.

JAMES P. FISHER.